(12) United States Patent
Ahn et al.

(10) Patent No.: US 10,593,935 B2
(45) Date of Patent: Mar. 17, 2020

(54) POSITIVE ACTIVE MATERIAL INCLUDING A SHELL INCLUDING A METALCATION, MANUFACTURING METHOD THEREOF, AND POSITIVE ELECTRODE AND LITHIUM BATTERY INCLUDING THE POSITIVE ACTIVE MATERIAL

(71) Applicants: Samsung Electronics Co., Ltd., Suwon-si, Gyeonggi-do (KR); Samsung SDI Co., Ltd., Yongin-si, Gyeonggi-do (KR)

(72) Inventors: Sungjin Ahn, Anyang-si (KR); Jinhwan Park, Seoul (KR); Jayhyok Song, Yongin-si (KR); Andrei Kapylou, Yongin-si (KR); Byongyong Yu, Yongin-si (KR)

(73) Assignees: SAMSUNG ELECTRONICS CO., LTD., Gyeonggi-do (KR); SAMSUNG SDI CO., LTD., Gyeonggi-do (KR)

( * ) Notice: Subject to any disclaimer, the term of this patent is extended or adjusted under 35 U.S.C. 154(b) by 134 days.

(21) Appl. No.: 15/153,867

(22) Filed: May 13, 2016

(65) Prior Publication Data
US 2016/0336594 A1 Nov. 17, 2016

(30) Foreign Application Priority Data
May 15, 2015 (KR) .................. 10-2015-0068181

(51) Int. Cl.
| | | |
|---|---|---|
| *H01M 4/505* | (2010.01) | |
| *H01M 4/52* | (2010.01) | |
| *H01M 4/36* | (2006.01) | |
| *H01M 4/525* | (2010.01) | |
| *C01G 53/00* | (2006.01) | |
| *H01M 10/0525* | (2010.01) | |
| *H01M 4/62* | (2006.01) | |

(52) U.S. Cl.
CPC ............ *H01M 4/366* (2013.01); *C01G 53/00* (2013.01); *H01M 4/505* (2013.01); *H01M 4/525* (2013.01); *H01M 4/62* (2013.01); *H01M 10/0525* (2013.01)

(58) Field of Classification Search
None
See application file for complete search history.

(56) References Cited

U.S. PATENT DOCUMENTS 6,949,233 B2    9/2005  Kweon et al.
2008/0131782 A1*  6/2008  Hagiwara ............. C01G 51/42
                                                429/231.95

(Continued)

FOREIGN PATENT DOCUMENTS

CN    104538622 A  *  4/2015
KR    20020092736 A    12/2002

(Continued)

OTHER PUBLICATIONS

Derwent Abstract of CN104538622A, published Apr. 22, 2015 (Year: 2015).*

(Continued)

*Primary Examiner* — Lucas J. O'Donnell
(74) *Attorney, Agent, or Firm* — Cantor Colburn LLP

(57) ABSTRACT

A positive active material includes an over-lithiated lithium transition metal oxide having a core-shell structure, wherein a shell layer of the core-shell structure includes a metal cation.

13 Claims, 10 Drawing Sheets

VANADIUM

(56) References Cited

U.S. PATENT DOCUMENTS

| | | | |
|---|---|---|---|
| 2010/0086853 A1* | 4/2010 | Venkatachalam | H01M 4/362 |
| | | | 429/223 |
| 2010/0086854 A1* | 4/2010 | Kumar | H01M 4/505 |
| | | | 429/223 |
| 2014/0162126 A1 | 6/2014 | Cho et al. | |
| 2014/0193708 A1 | 7/2014 | Han et al. | |
| 2014/0193714 A1 | 7/2014 | Kim et al. | |
| 2014/0242463 A1* | 8/2014 | Song | H01M 4/366 |
| | | | 429/219 |
| 2015/0044513 A1* | 2/2015 | Endoh | H01M 4/131 |
| | | | 429/7 |

FOREIGN PATENT DOCUMENTS

| | | |
|---|---|---|
| KR | 1020140073953 A | 6/2014 |
| KR | 1020140059851 A | 7/2014 |
| KR | 1020140089244 A | 7/2014 |

OTHER PUBLICATIONS

English translation of JP2009158415A (Year: 2009).*
Jarvis et al., "Atomic Structure of a Lithium-Rich Layered Oxide Material for Lithium-Ion Batteries: Evidence of a Solid Solution," Chem. Mater. 2011, 23, 3614-21 (Year: 2011).*
S. Dou, "Review and prospect of layered lithium nickel manganese oxide as cathode materials for Li-ion batteries," J. Solid State Electrochem. 2013, 17, 911-26. (Year: 2013).*
JP2009158415 Machine Translation II (Year: 2009).*
New Trends In Intercalation Compounds for Energy Storage Springer 2012, p. 236 (Year: 2012).*
JP2009158415 Translation from STIC (Year: 2009).*

* cited by examiner

POSITIVE ACTIVE MATERIAL INCLUDING A SHELL INCLUDING A METALCATION, MANUFACTURING METHOD THEREOF, AND POSITIVE ELECTRODE AND LITHIUM BATTERY INCLUDING THE POSITIVE ACTIVE MATERIAL

CROSS-REFERENCE TO RELATED APPLICATION

This application claims priority to and the benefit of Korean Patent Application No. 10-2015-0068181, filed on May 15, 2015, in the Korean Intellectual Property Office, and all the benefits accruing therefrom under 35 U.S.C. § 119, the content of which is incorporated herein in its entirety by reference.

BACKGROUND

1. Field

The present disclosure relates to a positive active material, manufacturing methods thereof, and a positive electrode and a lithium battery including the positive active material.

2. Description of the Related Art

Transition metal oxides, such as $LiNiO_2$, $LiCoO_2$, $LiMn_2O_4$, $LiFePO_4$, $LiNi_xCo_{1-x}O_2$ (where $0 \leq x \leq 1$), and $LiNi_{1-x-y}Co_xMn_yO_2$ (where $0 \leq x \leq 0.5$ and $0 \leq y \leq 0.5$) are used as a positive active material for a lithium battery. These positive active materials have a limited lifespan and electrical capacity. Therefore, there is still a need to develop a positive active material having improved lifespan and voltage characteristics as well as high capacity.

SUMMARY

Provided is a high-capacity positive active material having improved lifespan characteristics during high voltage operation of a lithium battery.

Provided is a positive electrode including the positive active material.

Provided is a lithium battery including the positive electrode.

Provided is a method of manufacturing the positive active material.

Additional aspects will be set forth in part in the description which follows and, in part, will be apparent from the description, or may be learned by practice of the presented exemplary embodiments.

According to an aspect, a positive active material includes an over-lithiated lithium transition metal oxide having a core-shell structure, wherein shell layer of the core-shell structure includes a metal cation.

In an exemplary embodiment, the metal cation may be at least one metal cation selected from Period 2 to Period 7 of the Periodic Table of the Elements.

In an exemplary embodiment, the metal cation may be at least one metal cation selected from vanadium (V), aluminum (Al), magnesium (Mg), calcium (Ca), scandium (Sc), titanium (Ti), chromium (Cr), manganese (Mn), iron (Fe), cobalt (Co), nickel (Ni), copper (Cu), zinc (Zn), gallium (Ga), strontium (Sr), yttrium (Y), zirconium (Zr), niobium (Nb), molybdenum (Mo), ruthenium (Ru), rhodium (Rh), palladium (Pd), silver (Ag), cadmium (Cd), and indium (In).

In an exemplary embodiment, the amount of the metal cation may be about 0.1 mole percent (mol %) to about 10 mol % based on 1 mole of the overlithiated lithium transition metal oxide.

In an exemplary embodiment, a thickness of the shell layer of the core-shell structure may be about 0.1 nanometer (nm) to about 500 nm.

In an exemplary embodiment, the overlithiated lithium transition metal oxide may be represented by Formula 1:

$$xLi_2MO_3-(1-x)LiM'O_2 \quad \text{Formula 1}$$

wherein in Formula 1, M may have an average oxidation number of +4 and may be at least one element selected from Period 2 to Period 5 of the Periodic Table of the Elements, M' may have an average oxidation number of +3 and may be at least one element selected from Period 2 to Period 5 of the Periodic Table of the Elements, and $0<x<1$.

In an exemplary embodiment, M in Formula 1 may be at least one metal selected from Mn, Ti, Zr, Sn, and Mo, and M' in Formula 1 may be at least one metal selected from Ni, Co, Mn, Fe, Al, Mg, Zn, Cu, Cr, V, and Nb.

In an exemplary embodiment, the overlithiated lithium transition metal oxide may be represented by Formula 2:

$$xLi_2MnO_3-(1-x)LiNi_aCo_bMn_cO_2 \quad \text{Formula 2}$$

\wherein in Formula 2, $0<x<1$, $0<a<1$, $0<b<1$, $0<c<1$, and $a+b+c=1$.

In an exemplary embodiment, the overlithiated lithium transition metal oxide may be represented by Formula 3:

$$Li[Li_aNi_bCo_cMn_dM_f]O_{2-x}F_x \quad \text{Formula 3}$$

wherein in Formula 3, M may be at least one metal selected from Ti, V, Al, Mg, Cr, Fe, Zr, rhenium (Re), Al, boron (B), germanium (Ge), Ru, tin (Sn), Nb, Mo, and platinum (Pt), and $a+b+c+d+f=1$, $0<a<1$, $0<b<1$, $0<c<1$, $0<d<1$, $0 \leq f<1$, and $0<x<0.1$.

In an exemplary embodiment, the over-lithiated transition metal oxide includes a $Li_2MO_3$ phase and a $LiM'O_2$ phase and at least one of the $Li_2MO_3$ phase and the $LiM'O_2$ phase included in the shell layer of the core-shell structure may be doped with the metal cation.

In an exemplary embodiment, the over-lithiated transition metal oxide may be a particle having an average particle diameter of about 10 nm to about 500 micrometers (μm).

According to an aspect, a positive electrode includes the positive active material.

According to an aspect, a lithium battery includes the positive electrode.

According to an aspect, a method of manufacturing a positive active material includes: contacting a transition metal precursor and a metal cation precursor to form a coating including a metal cation on the transition metal precursor; combining the metal cation coated transition metal precursor with a Li source to form a mixture; and heat treating the mixture to obtain the positive electrode material, wherein the positive active material includes an over-lithiated lithium transition metal oxide having a core-shell structure, wherein a shell layer of the core-shell structure includes the metal cation.

BRIEF DESCRIPTION OF THE DRAWINGS

These and/or other aspects will become apparent and more readily appreciated from the following description of the exemplary embodiments, taken in conjunction with the accompanying drawings in which.

DETAILED DESCRIPTION

Figure 1:
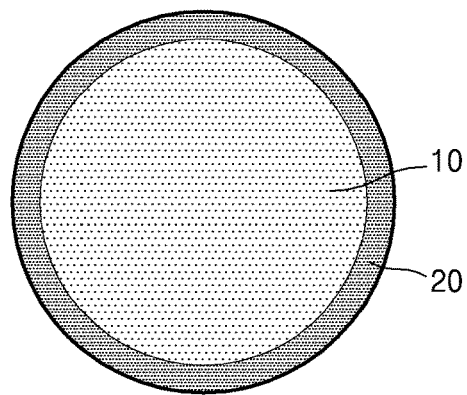
FIG. 1 is a schematic diagram illustrating a core-shell structure of an over-lithiated lithium transition metal oxide according to an exemplary embodiment.

Reference will now be made in detail to exemplary embodiments, examples of which are illustrated in the accompanying drawings, wherein like reference numerals refer to like elements throughout. In this regard, the present exemplary embodiments may have different forms and should not be construed as being limited to the descriptions set forth herein. Accordingly, the exemplary embodiments are merely described below, by referring to the figures, to explain aspects. Expressions such as "at least one of," when preceding a list of elements, modify the entire list of elements and do not modify the individual elements of the list.

It will be understood that when an element is referred to as being "on" another element, it can be directly on the other element or intervening elements may be present therebetween. In contrast, when an element is referred to as being "directly on" another element, there are no intervening elements present.

It will be understood that, although the terms "first," "second," "third," etc. may be used herein to describe various elements, components, regions, layers, and/or sections, these elements, components, regions, layers, and/or sections should not be limited by these terms. These terms are only used to distinguish one element, component, region, layer or section from another element, component, region, layer, or section. Thus, "a first element," "component," "region," "layer," or "section" discussed below could be termed a second element, component, region, layer, or section without departing from the teachings herein.

The terminology used herein is for the purpose of describing particular embodiments only and is not intended to be limiting. As used herein, the singular forms "a," "an," and "the" are intended to include the plural forms, including "at least one," unless the content clearly indicates otherwise. "At least one" is not to be construed as limiting "a" or "an." "Or" means "and/or." As used herein, the term "and/or" includes any and all combinations of one or more of the associated listed items. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Furthermore, relative terms, such as "lower" or "bottom" and "upper" or "top," may be used herein to describe one element's relationship to another element as illustrated in the Figures. It will be understood that relative terms are intended to encompass different orientations of the device in addition to the orientation depicted in the Figures. For example, if the device in one of the figures is turned over, elements described as being on the "lower" side of other elements would then be oriented on "upper" sides of the other elements. The exemplary term "lower," can therefore, encompasses both an orientation of "lower" and "upper," depending on the particular orientation of the figure. Similarly, if the device in one of the figures is turned over, elements described as "below" or "beneath" other elements would then be oriented "above" the other elements. The exemplary terms "below" or "beneath" can, therefore, encompass both an orientation of above and below.

"About" or "approximately" as used herein is inclusive of the stated value and means within an acceptable range of deviation for the particular value as determined by one of ordinary skill in the art, considering the measurement in question and the error associated with measurement of the particular quantity (e.g., the limitations of the measurement system). For example, "about" can mean within one or more standard deviations, or within ±30%, 20%, 10%, or 5% of the stated value.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

Exemplary embodiments are described herein with reference to cross section illustrations that are schematic illustrations of idealized embodiments. As such, variations from the shapes of the illustrations as a result, for example, of manufacturing techniques and/or tolerances, are to be expected. Thus, embodiments described herein should not be construed as limited to the particular shapes of regions as illustrated herein but are to include deviations in shapes that result, for example, from manufacturing. For example, a region illustrated or described as flat may have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the present claims.

Thus, positive active materials having various structures have been proposed. In particular, according to the demand for high-capacity batteries, composite oxides such as transition metal oxides having a layered structure, have been proposed as an alternative.

To address the need for an improved positive active material, positive active materials having various structures have been considered. For example, the positive active material may be a composite oxide such as a transition metal oxide having a layered structure, an example of which is $Li_2MO_3$-$LiMeO_2$ (where M and Me are transition metals). Since a large amount of lithium ions that are additionally substituted in the transition metal oxide layer may be reversibly intercalated and deintercalated, the positive active materials exhibit a high reversible capacity (e.g., >250 mAh/g). However, since a large amount of lithium is extracted from $Li_2MO_3$ as charging and discharging cycles proceed, structural changes occur in the lithium-rich composite oxide, and its capacity is decreases significantly. Also, a discharge voltage decreases, which is understood to be caused by a phase transition. Thus, remains a need to develop a positive active material having improved lifespan and voltage characteristics as well as high capacity.

A positive active material according to an exemplary embodiment includes an over-lithiated lithium transition metal oxide having a core-shell structure, wherein a shell layer of the core-shell structure includes a metal cation. That is, the shell layer of the core-shell structure may be doped with the metal cation.

In an exemplary embodiment, the over-lithiated lithium transition metal oxide may be represented by Formula 1:

$$xLi_2MO_3\text{-}(1-x)LiM'O_2 \qquad \text{Formula 1}$$

In Formula 1, M is has an average oxidation number of +4 and is at least one element selected from Period 2 to Period 5 of the Periodic Table of the Elements, M' has an average oxidation number of +3 and is at least one element selected from Period 2 to Period 5 of the Periodic Table of the Elements, and 0<x<1.

The over-lithiated lithium transition metal oxide may be a composite having a layered structure or may be in the form of a solid solution. In an exemplary embodiment, the over-lithiated lithium transition metal oxide may be in the form of a mixture comprising the $LiM'O_2$ phase and the $Li_2MO_3$ phase.

The over-lithiated lithium transition metal oxide has a structure in which a $LiM'O_2$ phase and a $Li_2MO_3$ phase are intermixed. Herein, similar to a structure of $LiM'O_2$, $Li_2MO_3$ has a structure in which a transition metal layer and a Li ion layer are alternately stacked, wherein about one third (⅓) of the metal ions included in the transition metal layer are substituted with Li ions. As such, due to the presence of Li ions that are additionally substituted in the transition metal layer, the $Li_2MnO_3$—$LiM'O_2$-based positive active material may provide improved capacity.

In Formula 1, M may be, for example, at least one metal of manganese (Mn), titanium (Ti), zirconium (Zr), tin (Sn), and molybdenum (Mo), and M' may be, for example, at least one of nickel (Ni), cobalt (Co), Mn, iron (Fe), aluminum (Al), magnesium (Mg), zinc (Zn), copper (Cu), chromium (Cr), vanadium (V), and niobium (Nb).

In an exemplary embodiment, the over-lithiated lithium transition metal oxide may be represented by Formula 2:

$$xLi_2MnO_3\text{-}(1-x)LiNi_aCo_bMn_cO_2 \qquad \text{Formula 2}$$

In Formula 2, 0<x<1, 0<a<1, 0<b<1, 0<c<1, and a+b+c=1.

In an exemplary embodiment, the over-lithiated lithium transition metal oxide may further include fluorine. For example, the over-lithiated lithium transition metal oxide may be doped with fluorine.

For example, the over-lithiated lithium transition metal oxide may be collectively represented by Formula 3 without phase distinction:

$$Li[Li_aNi_bCo_cMn_dM_f]O_{2-x}F_x \qquad \text{Formula 3}$$

In Formula 3, M may be at least one metal selected from Ti, V, Al, Mg, Cr, Fe, Zr, rhenium (Re), boron (B), germanium (Ge), ruthenium (Ru), Sn, Nb, and Mo, and a+b+c+d+f=1; 0<a<1, 0<b<1, 0<c<1, 0<d<1, 0≤f<1; and 0<x<0.1.

In an exemplary embodiment, in Formula 3, M may be at least one metal selected from Ti, V, Al, Mg, Cr, Fe, and Zr.

In an exemplary embodiment, in Formula 3, 0.1<a<0.25, 0.1<b<0.4, 0<c<0.2, and f=0, and d may satisfy 0.8<(2a+b)/d<1.2. Within these ranges, an over-lithiated lithium transition metal oxide having improved capacity as well as improved lifespan characteristics may be provided.

The over-lithiated lithium transition metal oxide may comprise particles having an average particle diameter of about 10 nanometers (nm) to about 500 micrometers (μm). For example, the particles of the over-lithiated lithium transition metal oxide may have an average particle diameter of about 10 nm to about 100 μm, or about 10 nm to about 50 μm. A lithium battery having improved physical properties may be provided when the over-lithiated lithium transition metal oxide has an average particle diameter within this diameter range.

Furthermore, the over-lithiated lithium transition metal oxide may also be, for example, in the form of nanoparticles having an average particle diameter of about 500 nm or less, about 200 nm or less, about 100 nm or less, about 50 nm or less, or about 20 nm or less. Since the use of nanoparticles of the over-lithiated lithium transition metal oxide may improve a density of the positive active material layer disposed on a positive electrode plate, use of the over-lithiated lithium transition metal oxide in a nanoparticulate form may be advantageous for providing high-rate discharge characteristics. Also, since a specific surface area is decreased, reducing reactivity with an electrolyte, cycle characteristics may also be improved.

As used herein, "average particle size" or "average particle diameter" or "D50 particle size" refer to a particle diameter corresponding to 50% of the particles in a distribution curve in which particles are accumulated in the order of particle diameter from the smallest particle to the largest particle and a total number of accumulated particles is 100%. D50 may be measured by methods known to those of skill in the art. For example, D50 may be measured with a particle size analyzer or may be measured by using a transmission electron microscope (TEM) or a scanning electron microscope (SEM) image. As an example of other measuring methods, particle size may be measured with a measurement device using dynamic light scattering, the number of particles within predetermined size ranges may be counted, and an average particle diameter may be calculated therefrom.

The over-lithiated lithium transition metal oxide has a theoretical capacity of about 360 milliampere hours per gram (mAh/g), which is greater than a capacity of a commercially available active material which is about 275 mAh/g. The over-lithiated lithium transition metal oxide also has an actual reversible capacity of about 250 mAh/g or more. Thus, the over-lithiated lithium transition metal oxide has improved capacity characteristics as compared to a commercially available positive active material, e.g., a positive active material having a reversible capacity of about 150 mAh/g to about 170 mAh/g.

The over-lithiated lithium transition metal oxide may have a core-shell structure, wherein a shell layer of core-shell structure is doped with a metal cation. That is, only a surface of particles of the over-lithiated lithium transition metal oxide may be selectively doped with a metal cation to thereby form the core-shell structure. In a preferred embodiment, a core of the core-shell structure is not doped with, and thus does not include, the metal cation.

Due to the presence of the shell layer doped with a metal cation on a surface of particles of the over-lithiated lithium transition metal oxide, a decrease in both a capacity and a voltage which may occur during the charging and discharging of a lithium battery may be suppressed, and thus, the lifespan characteristics of the lithium battery during high voltage operation (e.g., operation at a voltage of at least about 4.4 V) may be improved.

FIG. 1 schematically illustrates the core-shell structure of the over-lithiated lithium transition metal oxide according to an exemplary embodiment. Referring to FIG. 1, the over-lithiated lithium transition metal oxide includes a core 10 and a shell 20, in which the core 10 is not doped with a metal cation and the shell 20 is doped with a metal cation.

The metal cation may be at least one metal cation selected from Period 2 to Period 7 of the Periodic Table of the Elements. In an exemplary embodiment, the metal cation may be at least one of V, Al, Mg, calcium (Ca,) scandium (Sc), Ti, Cr, Mn, Fe, Co, Ni, Cu, Zn, gallium (Ga), strontium (Sr), yttrium (Y), Zr, Nb, Mo, Ru, rhodium (Rh), palladium (Pd), silver (Ag), cadmium (Cd), and indium (In). The metal cation ion may be, for example, selected from at least one of V, Al, Mg, Ca, and Ga.

An amount of the metal cation may be in a range of about 0.1 mole percent (mol %) to about 10 mol %, based on 1 mole of the over-lithiated lithium transition metal oxide. For example, the amount of the metal cation may be in a range of about 0.1 mol % to about 5 mol %, e.g., about 0.2 mol % to about 1 mol %, based on 1 mole of the over-lithiated lithium transition metal oxide.

A thickness of the shell 20 of the core-shell structure may be in a range of about 0.1 nm to about 500 nm. For example, the thickness of the shell 20 of the core-shell structure may be in a range of about 0.1 nm to about 300 nm, about 0.1 nm to about 100 nm, about 0.5 nm to about 50 nm, or about 1 nm to about 10 nm.

As discussed above, the over-lithiated lithium transition metal oxide comprises a $Li_2MO_3$ phase and a $LiM'O_2$ phase, and at least one of the $Li_2MO_3$ phase and the $LiM'O_2$ phase that are present in the shell 20 includes the metal cation.

The metal cation may be uniformly doped in the shell layer 20.

Alternatively, the metal cation may have a concentration gradient in the shell layer. For example, an amount of the metal cation may gradually decrease in a direction from an outer surface of the shell layer to an inner surface of the shell layer.

In an embodiment, a method of manufacturing a positive active material comprises: contacting a transition metal precursor and a metal cation precursor to form a coating comprising a metal cation on the transition metal precursor; combining the metal cation coated transition metal precursor with a Li source to form a mixture; and heat treating the mixture to obtain the positive active material, wherein the positive active material comprises an over-lithiated lithium transition metal oxide having a core-shell structure, wherein a shell layer of the core-shell structure comprises the metal cation.

A method of manufacturing a positive active material according to another exemplary embodiment is also provided.

The method of manufacturing a positive active material may include contacting a surface of a transition metal precursor with a metal cation precursor to form a coating comprising the metal cation on the surface of transition metal precursor. The contacting of the transition metal precursor and the metal cation precursor may include stirring a solution including the transition metal precursor and a metal cation-containing compound in a solvent.

The method may also include combining the metal cation which is coated transition metal precursor with a lithium source to form a mixture, and heat treating the mixture to obtain an over-lithiated lithium transition metal oxide having a core-shell structure, wherein a shell layer of the core-shell structure comprises, e.g., is doped with, the metal cation.

The method of manufacturing the positive active material may be different from other methods of doping a surface of particles of an over-lithiated lithium transition metal oxide directly with a metal cation. For example, disclosed is an embodiment which comprises coating a surface of the transition metal precursor with a metal cation first, and then, mixing the coated transition metal precursor with a Li source.

By performing the heat-treatment on the mixture of the metal cation precursor coated transition metal precursor and the Li source, wherein the surface of the transition metal precursor is coated with the metal cation, a positive active material may be prepared including an over-lithiated lithium transition metal oxide having a layer selectively doped with the metal cation on a surface of the particles of the over-lithiated lithium transition metal oxide.

The transition metal precursor is not particularly limited, and for example, may be a precursor in the form of a transition metal hydroxide.

The transition metal precursor in the form of the transition metal hydroxide may be, for example, synthesized by coprecipitation. For example, the precursor in the form of the transition metal hydroxide may be obtained by combining an aqueous solution of a water-soluble salt, such as a sulfate or a nitrate, and a transition metal source in the form of an oxide, at selected molar concentrations; and using a base, such as NaOH, $NH_4OH$, or KOH, as a pH-adjusting agent.

A coating solution may be used to coat the surface of the transition metal precursor with the metal cation precursor. The coating solution may include a metal cation precursor comprising at least one metal cation selected from Period 2 to Period 7 of the Periodic Table of the Elements. The metal cation of the metal cation precursor may be, for example, at least one metal cation of Mg, Al, Ca, Sc, Ti, V, Cr, Mn, Fe, Co, Ni, Cu, Zn, Ga, Sr, Y, Zr, Nb, Mo, Ru, Rh, Pd, Ag, Cd, and In. The metal cation precursor may be, for example, at least one of a hydroxide salt, a sulfate salt, a nitrate salt, a carbonate salt, and a halide salt of the metal cation, or a compound, such as acetylacetonate or nitrate, but is not limited thereto. Any suitable metal cation-containing compound may be used as the metal cation precursor.

The coating solution may be prepared by dissolving the metal cation precursor in water or an alcohol-based organic solvent (e.g., a C1 to C20 alcohol such as ethanol). A concentration of the coating solution may be appropriately adjusted in consideration of the final amount of metal cations to be included in the over-lithiated lithium transition metal oxide and the reaction conditions for the doping process.

The prepared transition metal precursor is added to the prepared coating solution, and the mixed solution is stirred. The solvent in the mixture may be evaporated during the stirring in a drying process. After drying, a metal cation precursor coated transition metal precursor (e.g., a transition metal precursor including metal cations coated on the surface of the transition metal precursor) is obtained.

When the lithium source is added to the metal cation precursor coated transition metal precursor to form a mixture, and the mixture is heat-treated, an over-lithiated lithium transition metal oxide having a core-shell structure may be obtained, wherein the shell is doped with the metal cation.

The lithium source may comprise, for example, at least one of lithium carbonate, lithium nitrate, lithium oxide, lithium hydroxide, and lithium halide, but is not limited thereto.

In an exemplary embodiment, the heat treatment may be performed at a temperature of about 800° C. or less, for example, at a temperature of about 600° C. to about 800° C. Within these temperature ranges, an over-lithiated lithium transition metal oxide of which the particles have improved compactness may be obtained.

The heat treatment may be performed for about 5 hours to about 20 hours.

In an exemplary embodiment, when the lithium source is added to the metal cation precursor coated transition metal precursor and the mixture is heat-treated, a fluorine compound may be added with the lithium source and heat treated.

During the heat treatment, a portion of the oxygen included in the over-lithiated lithium transition metal oxide is substituted by fluorine from the fluorine compound, thereby coating the over-lithiated lithium transition metal oxide with fluorine. The fluorine-doped over-lithiated lithium transition metal oxide may provide further improved lifespan characteristics of a lithium battery.

A fluorine compound may be added to the over-lithiated lithium transition metal oxide so that an amount of fluorine in the fluorine-doped over-lithiated lithium transition metal oxide may be about 10 mol % or less with respect to one mole of a total amount of the transition metals included in the fluorine-doped over-lithiated lithium transition metal oxide.

The fluorine compound may be, for example, at least one of lithium fluoride (LiF), magnesium fluoride ($MgF_2$), strontium fluoride ($SrF_2$), beryllium fluoride ($BeF_2$), calcium fluoride ($CaF_2$), ammonium fluoride ($NH_4F$), ammonium difluoride ($NH_4HF_2$), and ammonium hexafluoroaluminate (($NH_4)_3AlF_6$).

A positive electrode according to another embodiment may include the positive active material.

For example, a positive electrode slurry composition may be prepared by mixing the positive active material, a conductive agent, a binder, and a solvent. The positive electrode slurry composition may be coated directly on a positive electrode collector, and then dried, thereby preparing a positive electrode plate including a positive active material layer formed thereon. Alternatively, the positive electrode slurry composition may be cast onto a separate support and then detached from the support to prepare a positive active material film. A positive electrode plate including a positive active material layer formed thereon may then be prepared by laminating the positive active material film on the positive electrode collector.

Examples of the conductive agent may be at least one of carbon black, graphite fine particles, natural graphite, artificial graphite, black, Ketjen black, carbon fibers; carbon nanotubes; metal powders, fibers, or tubes, such as copper, nickel, aluminum, or silver; and conductive polymers, such as a poly(phenylene) derivative. However, the conductive agent is not limited thereto and any suitable conductive agent in the art may be used.

Examples of the binder may be at least one of vinylidene fluoride/hexafluoropropylene copolymer, polyvinylidene fluoride, polyacrylonitrile, poly(methyl methacrylate), polytetrafluoroethylene (PTFE), and styrene butadiene rubber-based polymer. Examples of the solvent may be at least one of N-methylpyrrolidone (NMP), acetone, and water. However, the solvent is not limited thereto and any suitable solvent suitable in the art may be used.

In some cases, pores may be formed in the electrode plate by further adding a plasticizer to the positive electrode slurry composition.

Amounts of the positive active material, conductive agent, binder, and solvent can be determined by one of skill in the art without undue experimentation. One or more of the conductive agent, binder, and solvent may be omitted depending upon the desired application and configuration of the lithium battery.

In addition, the positive electrode may include the positive active material alone, or may further include, an additional positive active material having at least one technical feature which differs from the above-described positive active materials, for example, a different composition or particle diameter.

The additional positive active material may be a lithium-containing metal oxide. Any suitable positive active material, including those in the art, may be used without limitation. For example, the positive active material may comprise at least one composite oxide, and the composite oxide may comprise at least one metal of cobalt, manganese, nickel, and lithium. As a particular example, the positive active material may be a compound represented by at least one of the following formulae may be used: $Li_aA_{1-b}B'_bD_2$ (where $0.90 \leq a \leq 1$ and $0 \leq b \leq 0.5$); $Li_aE_{1-b}B'_bO_{2-c}D_c$ (where $0.90 \leq a \leq 1$, $0 \leq b \leq 0.5$, and $0 \leq c \leq 0.05$); $LiE_{2-b}B'_bO_{4-c}D_c$ (where $0 \leq b \leq 0.5$ and $0 \leq c \leq 0.05$); $Li_aNi_{1-b-c}Co_bB'_cD_\alpha$ (where $0.90 \leq a \leq 1$, $0 \leq b \leq 0.5$, $0 \leq c \leq 0.05$, and $0 < \alpha \leq 2$); $Li_aNi_{1-b-c}Co_bB'_cO_{2-\alpha}F'_\alpha$ (where $0.90 \leq a \leq 1$, $0 \leq b \leq 0.5$, $0 \leq c \leq 0.05$, and $0 < \alpha < 2$); $Li_aNi_{1-b-c}CO_bB'_cO_{2-\alpha}F'_2$ (where $0.90 \leq a \leq 1$, $0 \leq b \leq 0.5$, $0 \leq c \leq 0.05$, and $0 < \alpha < 2$); $Li_aNi_{1-b-c}Mn_bB'_cD_\alpha$ (where $0.90 \leq a \leq 1$, $0 \leq b \leq 0.5$, $0 \leq c \leq 0.05$, and $0 < \alpha \leq 2$); $Li_aNi_{1-b-c}Mn_bB'_cO_{2-\alpha}F'_\alpha$ (where $0.90 \leq a \leq 1$, $0 \leq b \leq 0.5$, $0 \leq c \leq 0.05$, and $0 < a < 2$); $Li_aNi_{1-b-c}Mn_bB'_cO_{2-\alpha}F'_2$ (where $0.90 \leq a \leq 1$, $0 \leq b \leq 0.5$, $0 \leq c \leq 0.05$, and $0 < a < 2$); $Li_aNi_bE_cG_dO_2$ (where $0.90 \leq a \leq 1$, $0 \leq b \leq 0.9$, $0 \leq c \leq 0.5$, and $0.001 \leq d \leq 0.1$); $Li_aNi_bCo_cMn_dGeO_2$ (where $0.90 \leq a \leq 1$, $0 \leq b \leq 0.9$, $0 \leq c \leq 0.5$, $0 \leq d \leq 0.5$, and $0.001 \leq e \leq 0.1$); $Li_aNiG_bO_2$ (where $0.90 \leq a \leq 1$ and $0.001 \leq b \leq 0.1$); $Li_aCoG_bO_2$ (where $0.90 \leq a \leq 1$ and $0.001 \leq b \leq 0.1$); $Li_aMnG_bO_2$ (where $0.90 \leq a \leq 1$ and $0.001 \leq b \leq 0.1$); $Li_aMn_2G_bO_4$ (where $0.90 \leq a \leq 1$ and $0.001 \leq b \leq 0.1$); $QO_2$; $QS_2$; $LiQS_2$; $V_2O_5$; $LiV_2O_5$; $LiI'O_2$; $LiNiVO_4$; $Li_{(3-f)}J_2(PO_4)_3$ (where $0 \leq f \leq 2$); $Li_{(3-f)}Fe_2(PO_4)_3$ (where $0 \leq f \leq 2$); and $LiFePO_4$.

In the formulae above, A may be at least one of Ni, Co, and Mn; B' may be at least one of Al, Ni, Co, Mn, Cr, Fe, Mg, Sr, V, and a rare earth element; D may be at least one of O, F, S, and P; E may be at least one of Co and Mn; F' may be at least one of fluorine (F), S, and P; G may be at least one of Al, Cr, Mn, Fe, Mg, La, Ce, Sr, and V; Q may be at least one of Ti, Mo, and Mn; I' may be at least one of Cr, V, Fe, Sc, and Y; and J may be at least one of V, Cr, Mn, Co, Ni, and Cu.

For example, the positive active material may comprise at least one compound represented by $LiCoO_2$, $LiMn_xO_{2x}$ (where $x=1$, 2), $LiNi_{1-x}Mn_xO_{2x}$ (where $0 < x < 1$), $LiNi_{1-x-y}Co_xMn_yO_2$ (where $0 \leq x \leq 0.5$ and $0 \leq y \leq 0.5$), and $FePO_4$.

The additional positive active material have a coating layer on a surface of the compound, or the additional positive active material may be a mixture of the compound and a compound having a coating layer. The coating layer may include a compound of a coating element, such as an oxide, hydroxide, oxyhydroxide, oxycarbonate, or hydroxycarbonate. The coating layer may be amorphous or crystalline. The coating element included in the coating layer comprise at least one of Mg, Al, Co, potassium (K), sodium (Na), calcium (Ca), silicon (Si), Ti, V, Sn, Ge, Ga, B, As, and Zr. Any suitable coating method may be used to form a coating layer on a surface of the positive active material as long as the coating method does not adversely affect the physical properties of the positive active material. Further details of the coating method can be determined by one of skill in the art without undue experimentation, and thus are not provided for clarity.

The positive electrode collector may have a thickness of about 3 micrometers (μm) to about 500 μm. The positive electrode collector is not particularly limited, and any suitable positive electrode collector may be used as long as it does not generate an undesirable chemical change in the battery and has suitable conductivity. For example, the positive electrode collector may comprise at least one of copper, stainless steel, aluminum, nickel, titanium, sintered carbon, copper or stainless steel surface treated with carbon, nickel, titanium, silver, and an aluminum-cadmium alloy. In addition, adhesion of the positive active material may also be increased by forming fine irregularities on a surface of the positive electrode collector. The positive electrode collector may be used in various forms such as a film, sheet, foil, net, porous body, foam, or nonwoven fabric.

A mixture density of the positive electrode may be at least about 2.0 grams per cubic centimeter (g/cc).

A lithium battery according to another exemplary embodiment may include the positive electrode including the positive active material. The lithium battery may include, for example, a positive electrode including the positive active material; a negative electrode disposed to face the positive electrode; and an electrolyte disposed between the positive electrode and the negative electrode.

In the lithium battery, the positive electrode is prepared according to the above-described method of manufacturing a positive electrode.

A negative electrode may be manufactured as follows. The negative electrode may be manufactured in the same manner as in the positive electrode, except that a negative active material is used instead of the positive active material. In addition, a conductive agent, a binder, and a solvent that are used to prepare a negative electrode slurry composition may be the same as those used for the positive electrode slurry.

For example, a negative electrode slurry composition may be prepared by mixing the negative active material, a binder, a solvent, and, selectively, a conductive agent, and a negative electrode collector may be directly coated with the negative electrode slurry composition, thereby preparing a negative electrode plate. Alternatively, the negative electrode slurry composition may be cast on a separate support and detached from the support to form a negative active material film and a negative electrode plate may then be prepared by laminating the negative active material film on the negative electrode collector.

In addition, the negative active material may be any suitable negative active material for a lithium battery, including those in the art. For example, the negative active material may include at least one of lithium metal, a metal alloyable with lithium, transition metal oxide, non-transition metal oxide, and a carbon-based material.

For example, the metal alloyable with lithium may be at least one of Si, Sn, Al, Ge, Pb, Bi, Sb, a Si—Y' alloy (wherein Y' is an alkali metal, an alkaline earth metal, a Group 13 element, a Group 14 element, a transition metal, a rare earth element, or a combination thereof, and is not Si), and a Sn—Y" alloy (wherein Y" is an alkali metal, an alkaline earth metal, a Group 13 element, a Group 14 element, a transition metal, a rare earth element, or a combination thereof, and is not Sn). The element Y' and Y" may each independently be at least one of Mg, Ca, Sr, barium (Ba), radium (Ra), Sc, Y, Ti, Zr, hafnium (Hf), rutherfordium (Rf), V, Nb, tantalum (Ta), dubnium (Db), Cr, Mo, tungsten (W), seaborgium (Sg), technetium (Tc), Re, bohrium (Bh), Fe, lead (Pb), Ru, osmium (Os), hassium (Hs), Rh, Ir, Pd, platinum (Pt), Cu, Ag, Au, Zn, Cd, B, Al, Ga, Sn, In, Ti, Ge, P, arsenic (As), antiomony (Sb), bismuth (Bi), S, selenium (Se), tellurium (Te), and polonium (Po).

For example, the transition metal oxide may include at least one of lithium titanate, vanadium oxide, and lithium vanadium oxide.

For example, the non-transition metal oxide may include at least one of $SnO_2$ and $SiO_x$ (where $0 < x < 2$).

The carbon-based material may be at least one of crystalline carbon and amorphous carbon. The crystalline carbon may comprise at least one of graphite, such as shapeless, plate, flake, spherical, and fibrous natural graphite or artificial graphite, and the amorphous carbon may comprise at least one of soft carbon (low-temperature sintered carbon) or hard carbon, mesophase pitch, and sintered coke.

The amounts of the negative active material, conductive agent, binder, and solvent can be determined by one of skill in the art without undue experimentation.

The negative electrode collector may have a thickness of about 3 μm to about 500 μm. The negative electrode collector is not limited as long as it does not generate an undesirable chemical change in the battery and has suitable conductivity. For example, the negative electrode collector may comprise at least one of copper, stainless steel, aluminum, nickel, titanium, sintered carbon, copper or stainless steel surface treated with carbon, nickel, titanium, silver, and an aluminum-cadmium alloy. In addition, adhesion of the negative active material may also be increased by forming fine irregularities on a surface of the negative electrode collector. The negative electrode collector may be used in any suitable form, such as a film, sheet, foil, net, porous body, foam, or nonwoven fabric.

The positive electrode and the negative electrode may be separated by a separator, and any suitable separator, including those in the art, may be used. In particular, a separator having high solvent or moisture-retention ability for an electrolyte as well as low resistance to the transfer of electrolyte ions may be desirable. For example, the separator may be at least one material of glass fibers, polyester, polyethylene, polypropylene, and polytetrafluoroethylene (PTFE). The separator may be a nonwoven or woven fabric. The separator may have a pore diameter of about 0.01 μm to about 10 μm, and a thickness of about 5 μm to about 300 μm.

The electrolyte may comprise a lithium salt-containing non-aqueous electrolyte comprising a non-aqueous electrolyte and lithium. The non-aqueous electrolyte may comprise at least one of a non-aqueous electrolyte solution, an organic solid electrolyte, and an inorganic solid electrolyte.

A solvent for the non-aqueous electrolyte solution may be, for example, at least one of an aprotic organic solvent, such as N-methyl-2-pyrrolidinone, propylene carbonate, ethylene carbonate, butylene carbonate, dimethyl carbonate, diethyl carbonate, γ-butyrolactone, 2-dimethoxy ethane, tetrahydrofuran, 2-methyltetrahydrofuran, dimethyl sulfoxide, 1,3-dioxolane, formamide, dimethylformamide, dioxolane, acetonitrile, nitromethane, methyl formate, methyl acetate, phosphate triester, trimethoxy methane, a dioxolane derivative, sulfolane, methylsulfolane, 1,3-dimethyl-2-imidazolidinone, a propylene carbonate derivative, a tetrahydrofuran derivative, ether, methyl propionate, and ethyl propionate.

The organic solid electrolyte may comprise, for example, at least one of a polyethylene derivative, a polyethylene oxide derivative, a polypropylene oxide derivative, a phosphate ester polymer, poly(L-lysine), polyester sulfide, polyvinyl alcohol, polyvinylidene fluoride, and a polymer including an ionic dissociation group.

The inorganic solid electrolyte may comprise, for example, at least one of nitrides, halides, and sulfates of Li, such as $Li_3N$, LiI, $Li_5NI_2$, $Li_3N$—LiI—LiOH, $LiSiO_4$, $LiSiO_4$—LiI—LiOH, $Li_2SiS_3$, $Li_4SiO_4$, $Li_4SiO_4$—LiI—LiOH, and $Li_3PO_4$—$Li_2S$—$SiS_2$.

Any suitable lithium salt suitable, including those in the art may be used. A lithium salt suitable for being dissolved in the non-aqueous electrolyte may be, for example, at least one of LiCl, LiBr, LiI, $LiClO_4$, $LiBF_4$, $LiB_{10}Cl_{10}$, $LiPF_6$, $LiCF_3SO_3$, $LiCF_3CO_2$, $LiAsF_6$, $LiSbF_6$, $LiAlCl_4$, $CH_3SO_3Li$, $CF_3SO_3Li$, $(CF_3SO_2)_2NLi$, lithium chloroborate, lower aliphatic carboxylic acid lithium, lithium tetraphenyl borate, and lithium imide.

The lithium battery may be a lithium-ion battery, a lithium-ion polymer battery, or a lithium polymer battery according to a type of a separator and an electrolyte being used. The lithium battery may be a cylindrical, prismatic, coin, or pouch type according to a shape of the battery, and may be a bulk type or a thin-film type according to a size of the battery. In addition, both lithium primary and secondary batteries may be included.

Since manufacturing methods of the above-described batteries are widely known in the art, further detailed description thereof is not provided.

Figure 2:
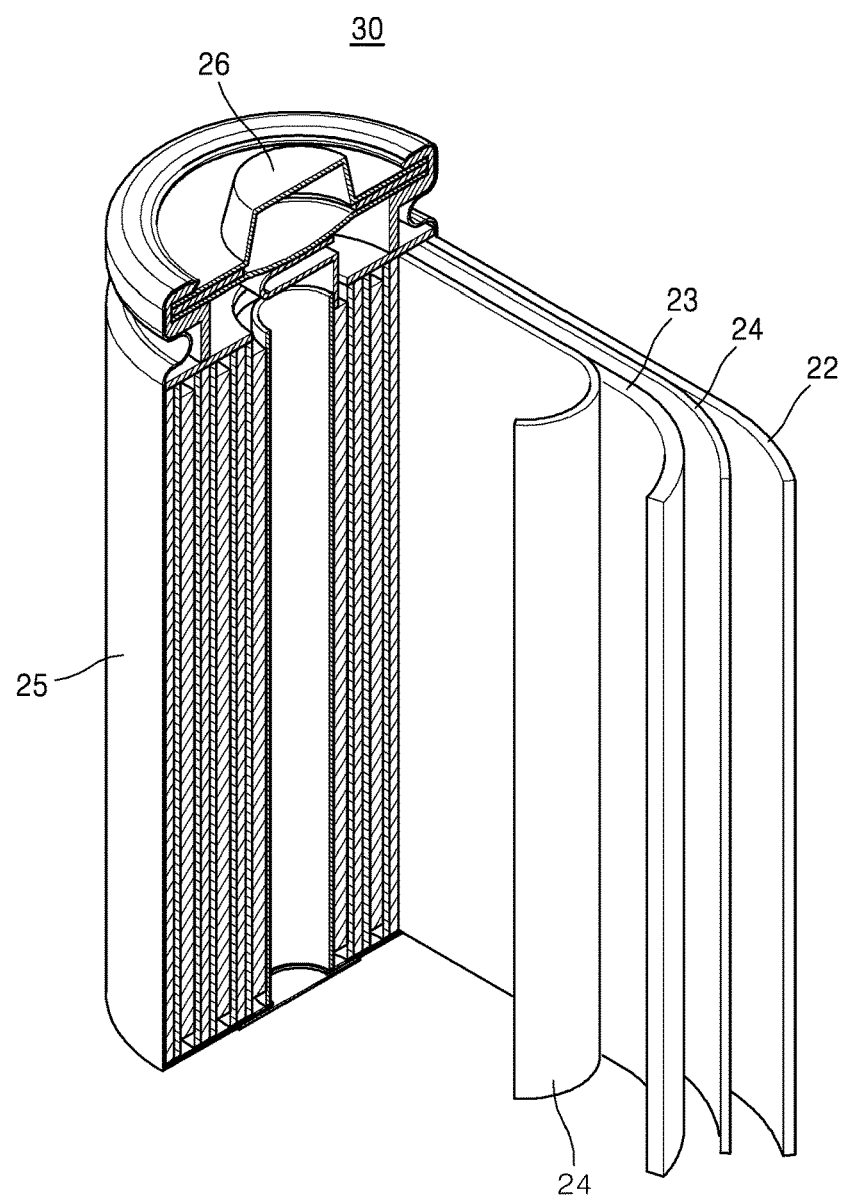
FIG. 2 is a schematic diagram illustrating a structure of a lithium battery according to an exemplary embodiment.

FIG. 2 is a schematic illustration of a representative structure of a lithium battery 30 according to an exemplary embodiment.

Referring to FIG. 2, the lithium battery 30 includes a positive electrode 23, a negative electrode 22, and a separator 24 between the positive electrode 23 and the negative electrode 22. The positive electrode 23, the negative electrode 22, and the separator 24 are wound or folded to be contained in a battery case 25. Subsequently, an electrolyte is injected into the battery case 25 and the lithium battery 30 may be sealed with a sealing member 26. The battery case 25 may be a cylindrical, rectangular, or thin-film type. The lithium battery may be a lithium-ion battery.

The lithium battery is also suitable for applications benefiting from high capacity, high output, and high-temperature operation, such as electric vehicles, in addition to applications such as mobile phones and portable computers. The lithium battery may also be used in hybrid vehicles by combining the lithium battery with an internal combustion engine, fuel cell, or super capacitor. Furthermore, the lithium battery may be used in electric bikes, power tools, and other applications which can benefit from high output, high voltage, and high-temperature operation.

Further detail is provided in the Examples and Comparative Examples disclosed below. These examples are provided to exemplify the technical idea of the present disclosure, and the scope of the present disclosure shall not be limited thereto.

EXAMPLES

Example 1

(1) Manufacture of Positive Active Material

A coating solution was prepared by adding 1.51 grams (g) of vanadium acetylacetonate ($V(C_5H_7O_2)_3$) to 300 milliliters (mL) of ethanol. Then, 100 g of a transition metal precursor in the form of a transition metal hydroxide having a composition of $Ni_{0.2567}Co_{0.1030}Mn_{0.6403}(OH)_2$ (hereinafter, the transition metal precursor is referred to as "overlithiated lithium transition metal oxide (OLO) precursor") was added to the coating solution, and then the mixed solution was stirred for 10 hours. Meanwhile, ethanol was removed by drying to obtain an OLO precursor doped with a vanadium cation.

The vanadium cation-coated OLO precursor was mixed with 56.43 g of $LiCO_3$ and 1.65 g of LiF, and then, the mixture was subjected to a heat treatment for 10 hours at a temperature in a range of about 700° C. to about 800° C., thereby manufacturing an OLO having a core-shell structure in which a surface of the OLO was doped with the vanadium cation at a concentration of 0.5 mol % (hereinafter, the OLO doped with a metal cation was referred to as 'OLO active material').

(2) Manufacture of Coin Half-Cell

The OLO active material and a conductive carbon black conductive agent (Super-P®; Timcal Ltd.) were uniformly mixed at a weight ratio of about 90:5, and an OLO active material slurry was then prepared by adding a polyvinylidene fluoride (PVDF) binder solution to the mixture of the OLO active material and the carbon conductive agent to obtain a weight ratio of active material:carbon conductive agent:binder of about 92:4:4.

A coating of the OLO active material slurry was applied to an aluminum foil having a thickness of about 15 μm. Then, the resulting product was dried to prepare a positive electrode plate, and then, further dried in a vacuum to prepare a coin half-cell (CR2032 type) having a diameter of about 12 mm. Here, the positive electrode has a loading amount of about 5.5 milligrams per square centimeter (mg/cm$^2$).

In the coin cell, metallic lithium was used as a counter electrode, a polypropylene separator (Celgard® 3501) was used as a separator, and an electrolyte was prepared by dissolving 1.3 molar (M) LiPF$_6$ in a solvent mixture of ethylene carbonate (EC) and diethyl carbonate (DEC) in a volume ratio of about 3:7 EC:DEC.

Example 2

A coin half-cell was prepared in the same manner as in Example 1 except that a coating solution was prepared by using 4.24 g of aluminum nitrate (Al(NO$_3$)$_3$.9H$_2$O) instead of V(C$_5$H$_7$O$_2$)$_3$, to manufacture an OLO active material having a core-shell structure in which a surface of the OLO was doped with an aluminum cation at a concentration of 1 mol %.

Example 3

A coin half-cell was prepared in the same manner as in Example 1, except that a coating solution was prepared by using 2.56 g of magnesium nitrate (Mg(NO$_3$)$_2$.6H$_2$O) instead of V(C$_5$H$_7$O$_2$)$_3$, to thereby manufacture an OLO active material having a core-shell structure of in which a surface of the OLO was doped with a magnesium cation at a concentration of 1 mol %.

Example 4

A coin half-cell was prepared in the same manner as in Example 1, except that a coating solution was prepared by using 2.56 g of gallium nitrate (Ga(NO$_3$)$_3$) instead of V(C$_5$H$_7$O$_2$)$_3$, to thereby manufacture an OLO active material having a core-shell structure in which a surface of the OLO was doped with a gallium cation at a concentration of 1 mol %.

Comparative Example 1

A coin half-cell was prepared in the same manner as in Example 1, except that an OLO active material used was not doped with the vanadium cation.

Comparative Example 2

When synthesizing the OLO oxide precursor of Example 1, an OLO precursor having the vanadium cation entirely distributed therein was obtained by dissolving VOSO$_4$ (0.5 mol %) in an aqueous solution and co-precipitating the aqueous solution.

Afterwards, an OLO active material was obtained by adding a lithium salt and performing a heat treatment according to the same procedure as in Example 1, thereby manufacturing a coin half-cell.

Evaluation Example 1: Confirmation of Core-Shell Structure

To confirm the core-shell structure of the OLO active material doped with the vanadium cation of Example 1, scanning electron microscope-energy dispersive X-ray spectroscopy (SEM-EDAX) was performed using a Nova Nano SEM 450 (available by FEI Company).

Figure 3A:
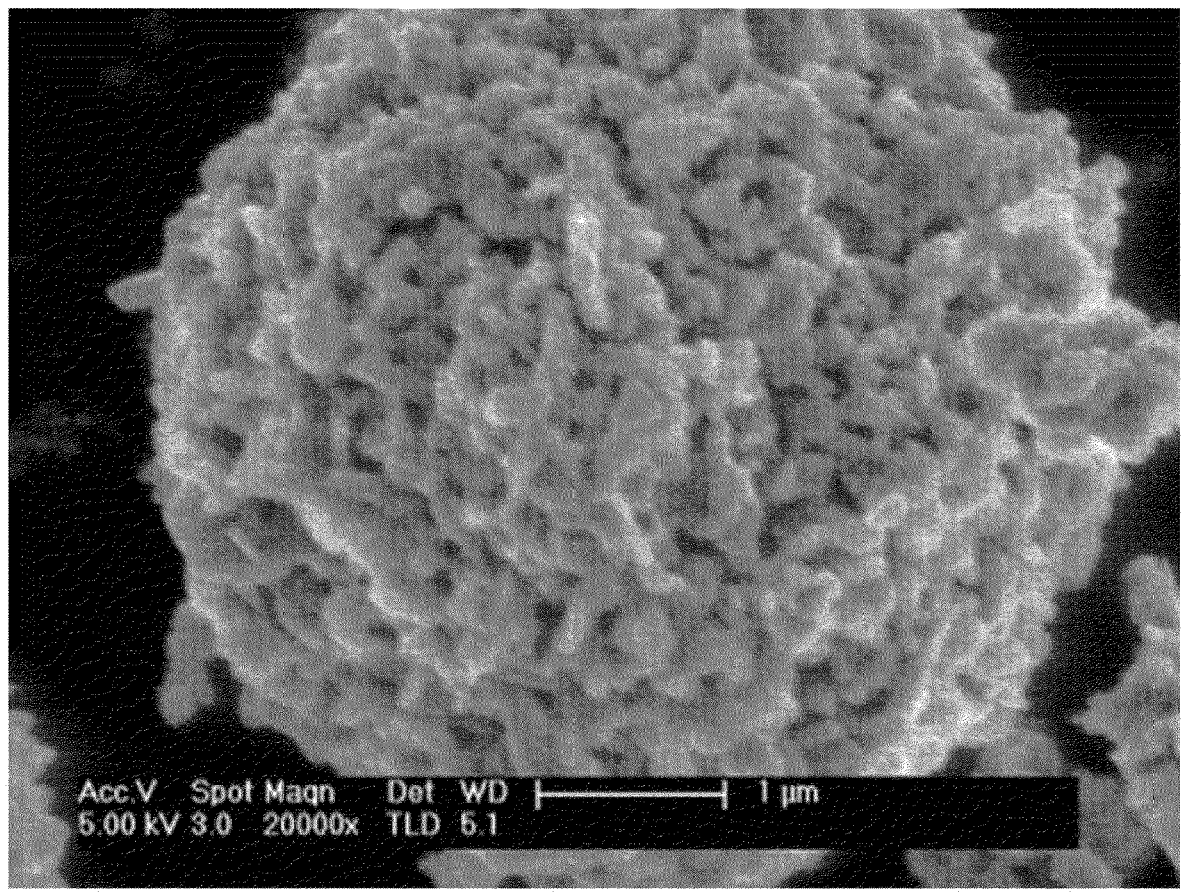
FIG. 3A is a scanning electron microscope-energy dispersive X-ray spectroscopy (SEM-EDAX) image of an over-lithiated lithium transition metal oxide active material particle doped with a vanadium cation manufactured in Example 1.
Figure 3B:
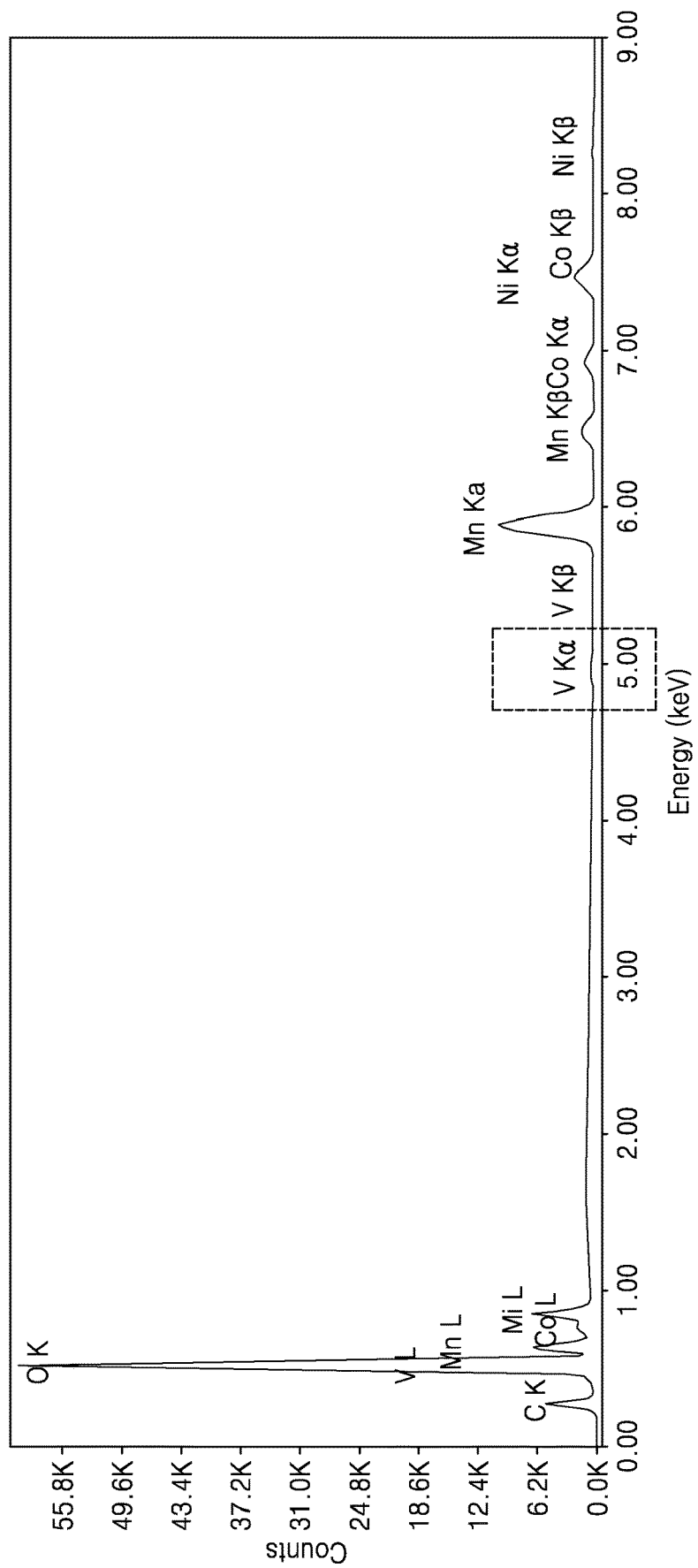
FIG. 3B is a graph of counts versus energy (kiloelectron volts, keV) and shows the results of SEM-EDAX analysis of the over-lithiated lithium transition metal oxide active material particle doped with a vanadium cation of Example 1.

FIGS. 3A and 3B show SEM-EDAX results obtained by observing and analyzing particles of the OLO active material doped with the vanadium cation of Example 1. As shown in FIGS. 3A and 3B and based on the EDAX analysis results, it was confirmed that the particles of the OLO active material doped with the vanadium cation as manufactured in Example 1 included a small amount of a vanadium atom (V).

Figure 4:
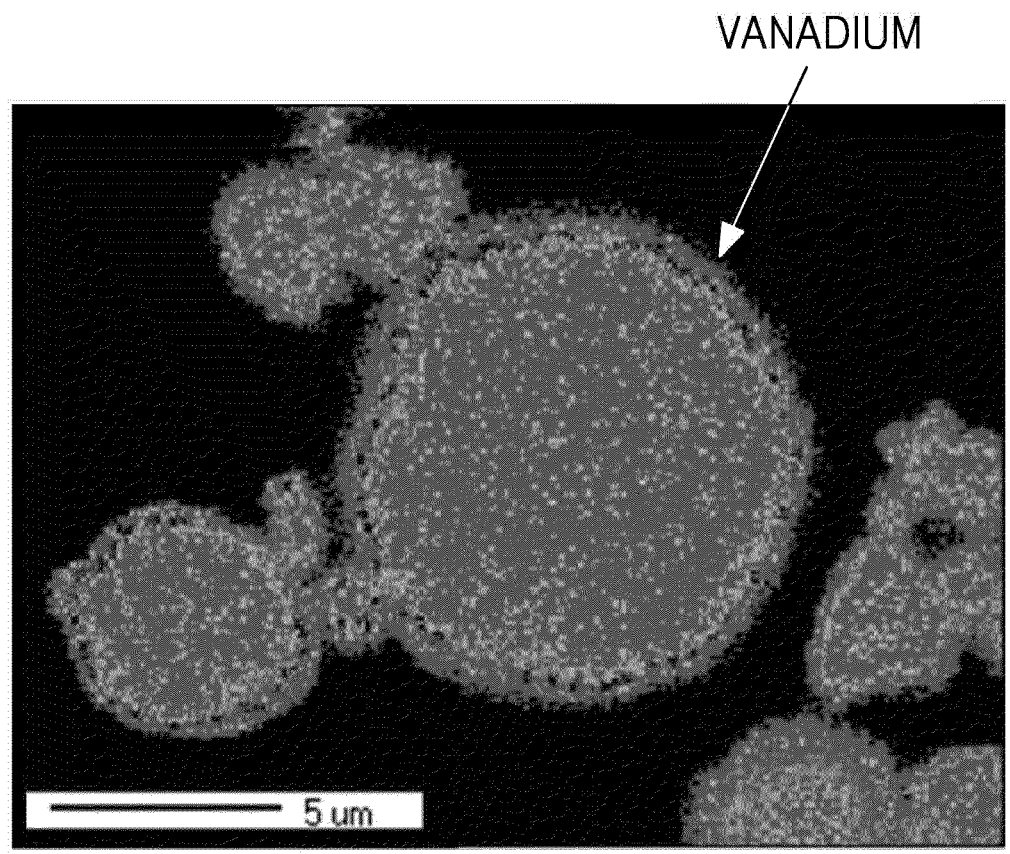
FIG. 4 is an electron probe microanalysis (EPMA) image of a cross-section of the over-lithiated lithium transition metal oxide active material particle doped with a vanadium cation manufactured in Example 1.

FIG. 4 is an image showing an electron probe microanalysis (EPMA) result with respect to a cross-section of the particles of the OLO active material particle doped with the vanadium cation of Example 1. As shown in FIG. 4, a layer of the vanadium cation doping the surface of the particles of the OLO active material was formed thereon, thereby forming a core-shell structure.

Figure 5:
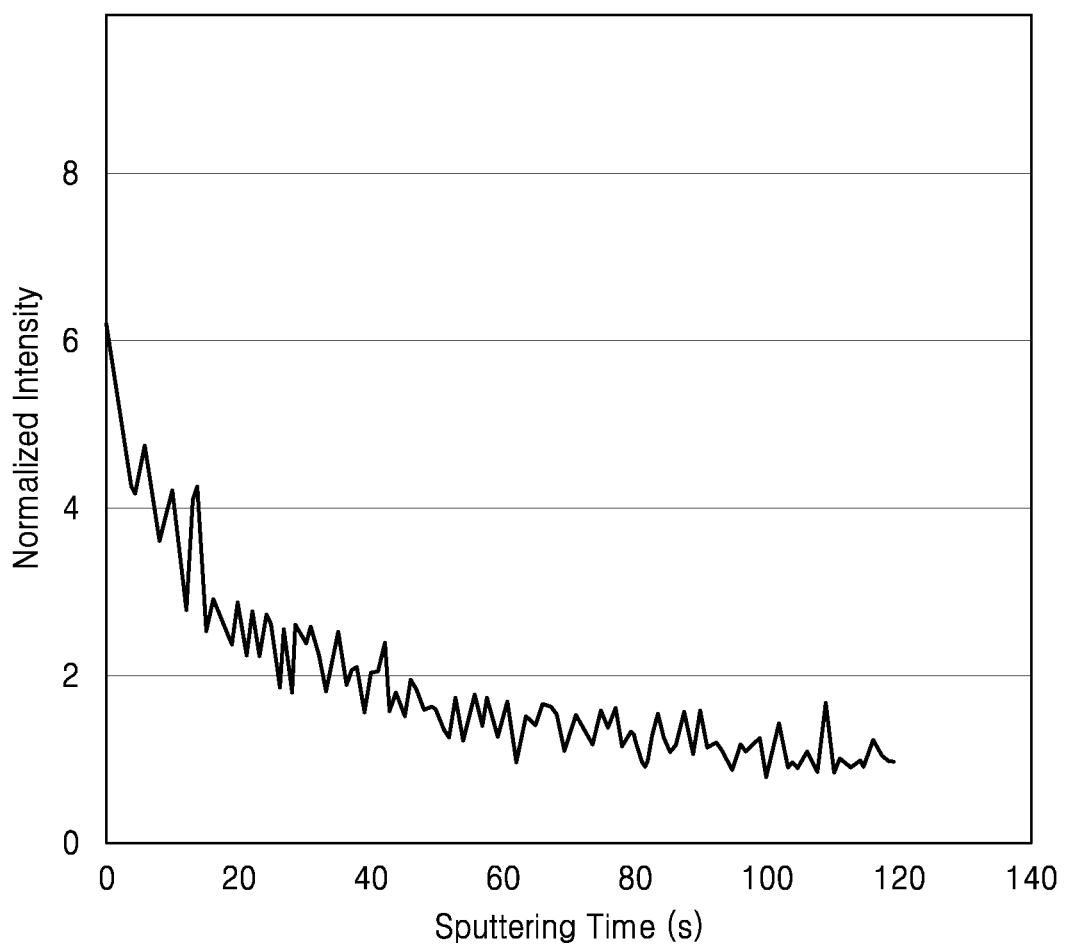
FIG. 5 is a graph of normalized intensity versus sputtering time (seconds, s) and shows the results of time of flight secondary on mass spectroscopy (TOF-SIMS) depth profile analysis of the over-lithiated lithium transition metal oxide active material particle doped with a vanadium cation manufactured in Example 1.

FIG. 5 shows an analysis result obtained by a time of flight secondary ion mass spectroscopy (TOF-SIMS) depth profile of the particles of the OLO active material doped with the vanadium cation of Example 1, performed using the Ion-TOF 4 (available by IONTOF company). As shown in FIG. 5, it was confirmed that the vanadium atom V was present in high concentration on the particle surface and showed a concentration gradient that gradually decreased in a direction from the outer surface toward the inside of the particles.

Evaluation Example 2: Evaluation of Battery Lifespan and Voltage Characteristics To confirm the doping effects of the metal cation having the core-shell structure, the coin half-cells of Examples 1 to 3 and Comparative Examples 1 and 2 were subjected to evaluation of lifespan and voltage characteristics as follows.

The coin half-cells of Examples 1 to 3 and Comparative Examples 1 and 2 were charged at 0.1 C constant current rate to a voltage of 4.7 V (vs. Li) at 25° C., and then, discharged at a 0.1 C constant current rate until the voltage reached 2.5 V (vs. Li) (formation operation).

The coin half-cells subjected to the above formation operation were charged at a 1.0 C constant current rate to a voltage of 4.6 V (vs. Li) at 25° C., and then, discharged at a 1.0 C constant current rate until the voltage reached 2.5 V (vs. Li). The above cycle of charging and discharging was repeated 40 times. The C rate is a discharge rate of a cell, and is obtained by dividing a total capacity of the cell by a total discharge period of time, e.g., a C rate for a battery having a discharge capacity of 1.6 ampere-hours would be 1.6 amperes.

Figure 6:
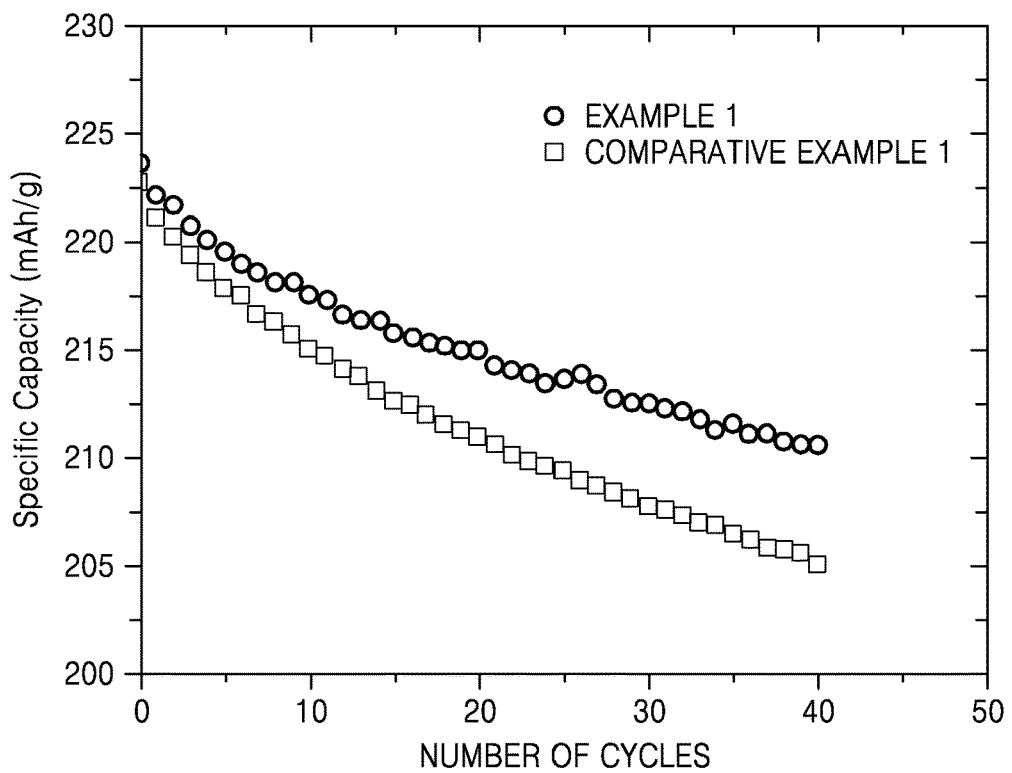
FIG. 6 is a graph of discharge specific capacity (milliampere hours per gram, mAh/g) versus the number of cycles of the materials prepared in Example 1 and Comparative Example 1.
Figure 7:
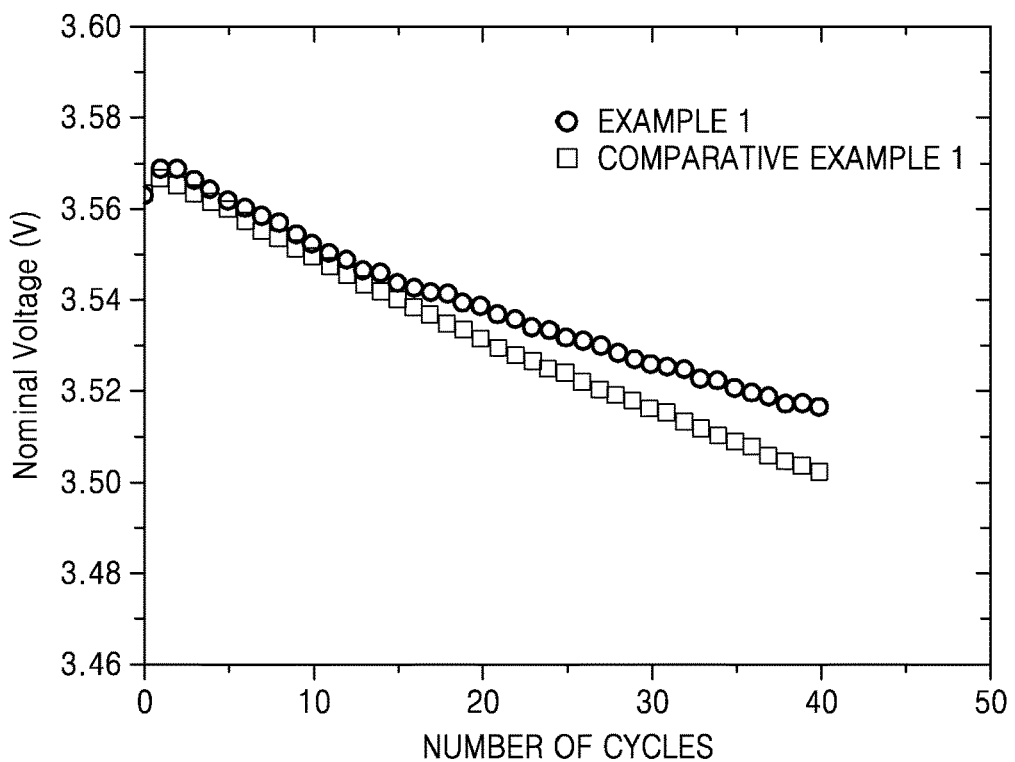
FIG. 7 is a graph of nominal voltage (V) versus the number of cycles of the materials prepared in Example 1 and Comparative Example 1.

To confirm the doping effects of the metal cation, the discharge capacity per cycle and voltage characteristics of the coin half-cell of Example 1 were compared with those of the coin half-cell of Comparative Example 1. The results comparing the discharge capacity per number of cycles are shown in FIG. 6 and the results of comparing the voltage characteristics are shown in FIG. 7.

Figure 8:
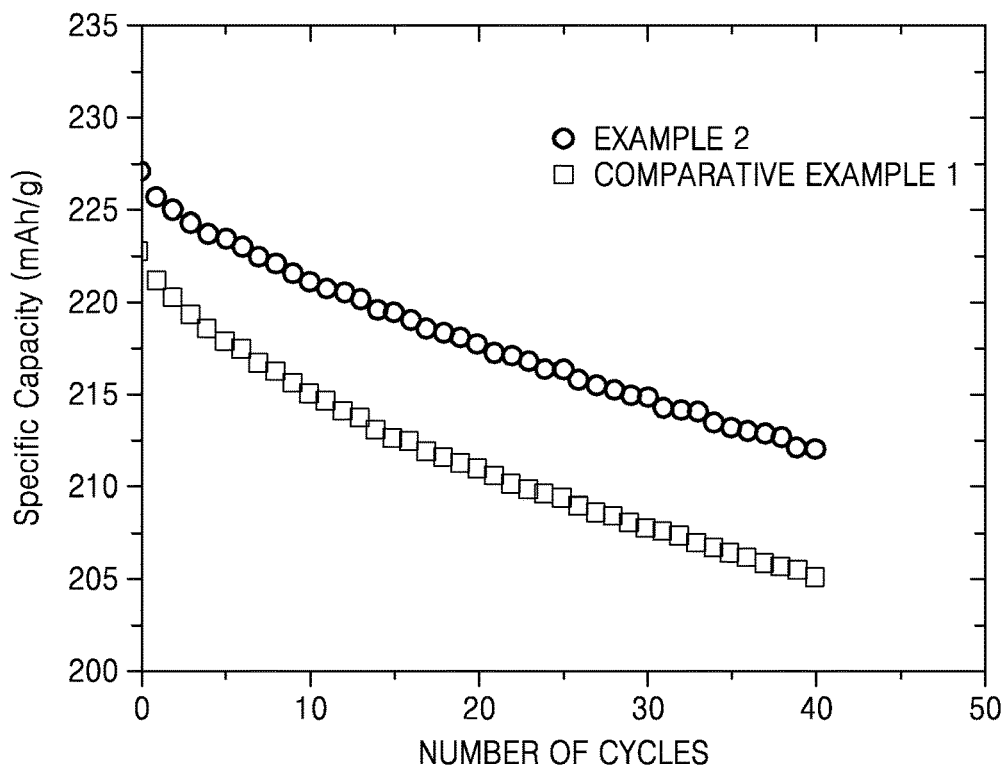
FIG. 8 is a graph of discharge specific capacity (mAh/g) versus number of cycles of the materials prepared in Example 2 and Comparative Example 1.
Figure 9:
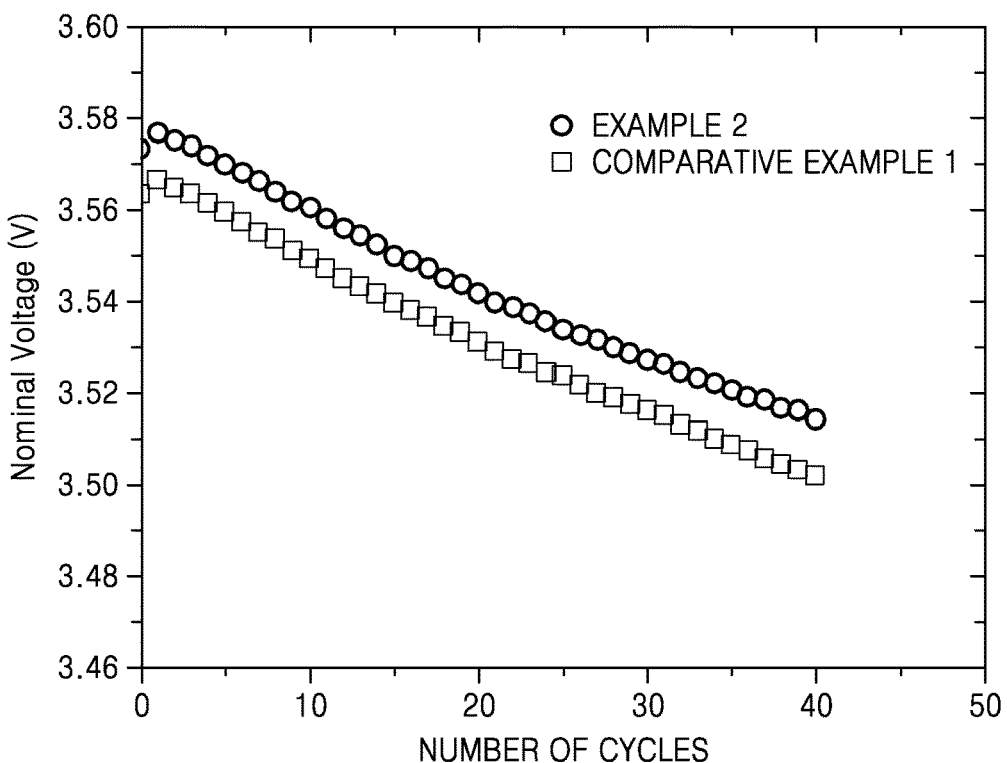
FIG. 9 is a graph of nominal voltage (V) characteristics versus number of cycles of the materials prepared in Example 2 and Comparative Example 1.

The discharge capacity per cycle and voltage characteristics of the coin half-cell of Example 2 were compared with those of the coin half-cell of Comparative Example 1, and the results of comparing the discharge capacity per number of cycles are shown in FIG. 8 and the results of comparing the voltage characteristics are shown in FIG. 9.

Figure 10:
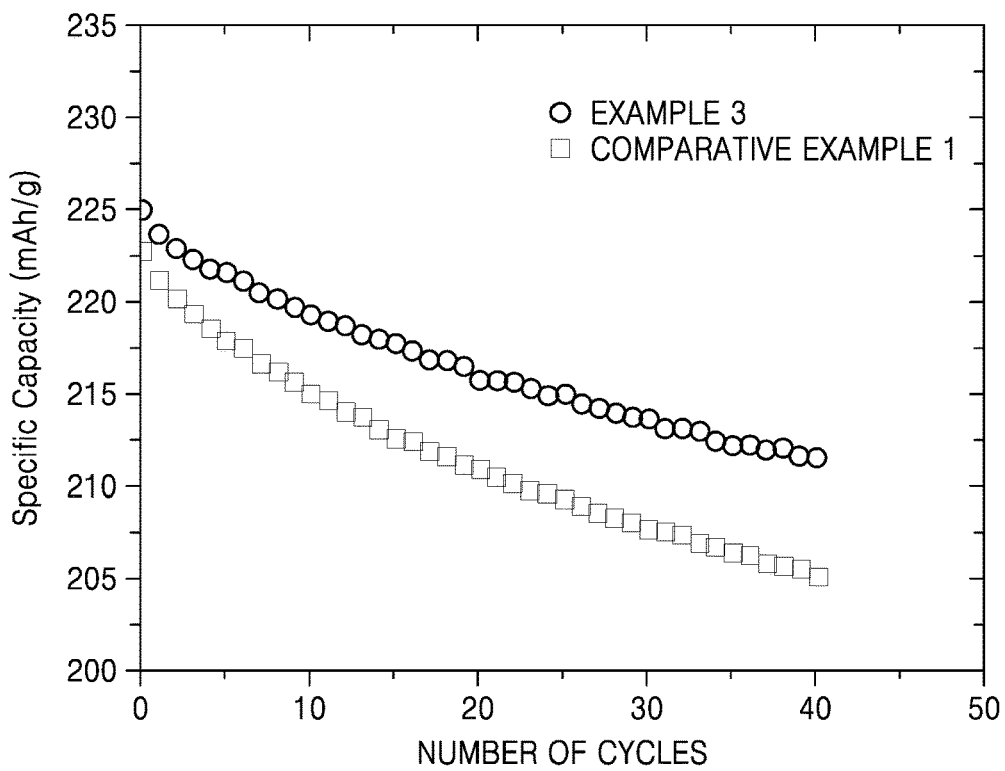
FIG. 10 is a graph of discharge specific capacity (mAh/g) per cycle of the materials prepared in Example 3 and Comparative Example 1.
Figure 11:
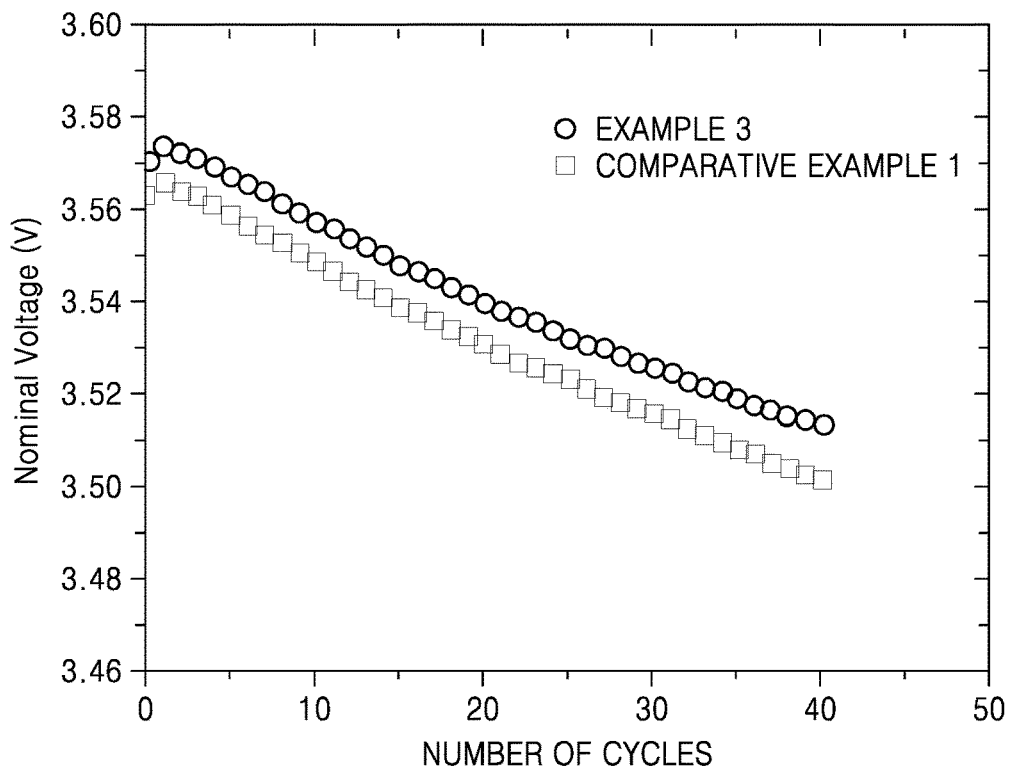
FIG. 11 is a graph of nominal voltage (V) versus number of cycles of the materials prepared in Example 3 and Comparative Example 1.

The discharge capacity per cycle and voltage characteristics of the coin half-cell of Example 3 were compared with those of the coin half-cell of Comparative Example 1, and the results of comparing the discharge capacity per number of cycles are shown in FIG. 10 and the results of comparing the voltage characteristics are shown in FIG. 11.

Figure 12:
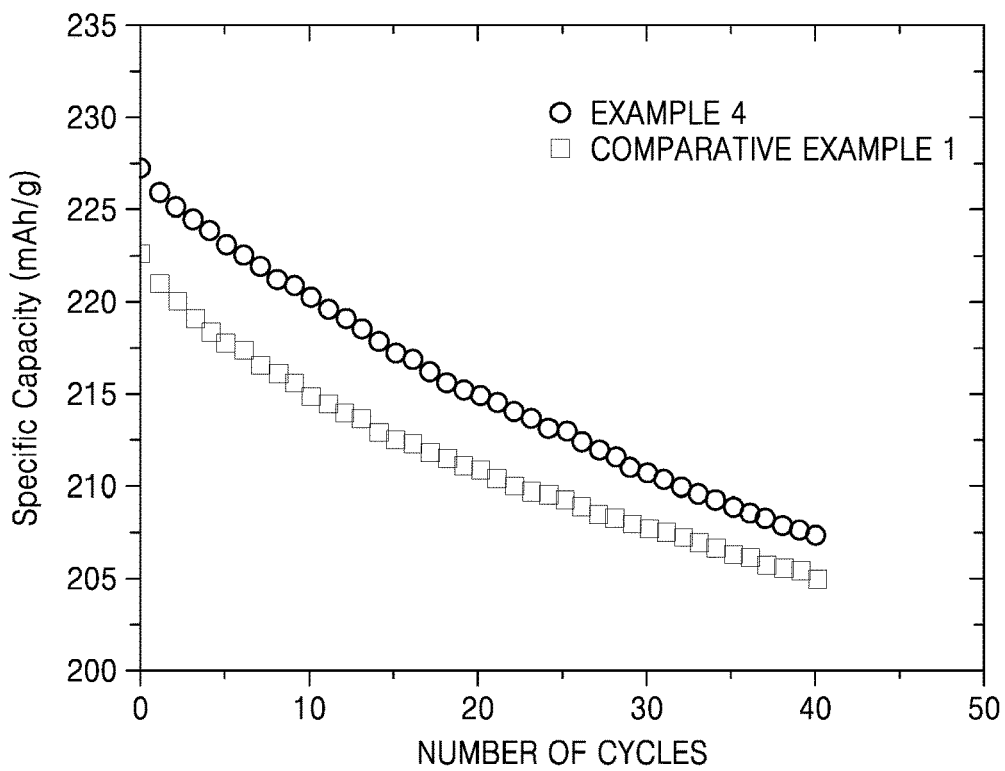
FIG. 12 is a graph of discharge specific capacity (mAh/g) versus number of cycles of the materials prepared in Example 4 and Example 1.
Figure 13:
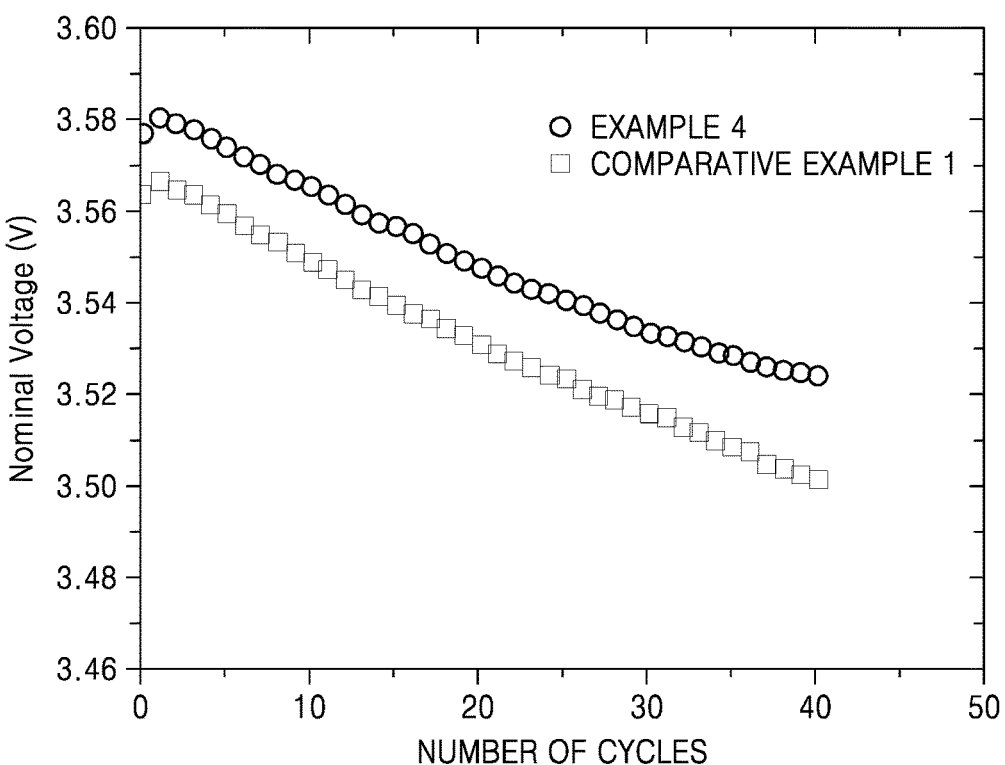
FIG. 13 is a graph of nominal voltage (V) versus number of cycles of the materials prepared in Example 4 and Example 1.

The discharge capacity per cycle and voltage characteristics of the coin half-cell of Example 4 were compared with those of the coin half-cell of Comparative Example 1, and the results of comparing the discharge capacity per number of cycles are shown in FIG. 12 and the results of comparing the voltage characteristics are shown in FIG. 13.

As shown in FIGS. 6 to 13, and based on the cases where the surface of the OLO positive active material was doped with the metal cation to form a core-shell structure, it was confirmed that the lifespan and voltage characteristics of the coin half-cell prepared using the OLO active material that was doped with the metal cation were improved as compared to those of the coin half-cell prepared by using the OLO active material that was not doped with the metal cation half-coin cells.

In detail, during the cycles of charging and discharging repeated 40 times, the lifespan characteristics of the coin half-cell doped with the vanadium cation showed an increase of about 3% while the voltage characteristics of the coin half-cell doped with the vanadium cation showed an improvement of about 12 millivolts (mV). Likewise, during the cycle of charging and discharging repeated 40 times, the lifespan characteristics of the coin half-cell doped with the aluminum cation showed an increase of about 2% while the voltage characteristics of the coin half-cell doped with the aluminum cation showed an improvement of about 2 mV. Likewise, during the cycle of charging and discharging repeated 40 times, the lifespan characteristics of the coin half-cell doped with the magnesium cation showed an increase of about 2% while the voltage characteristics of the coin half-cell doped with the magnesium cation showed an improvement of about 4 mV. Likewise, during the cycle of charging and discharging repeated 40 times, the voltage characteristics of the coin half-cell doped with the gallium cation showed a significant improvement of about 8 mV.

Figure 14:
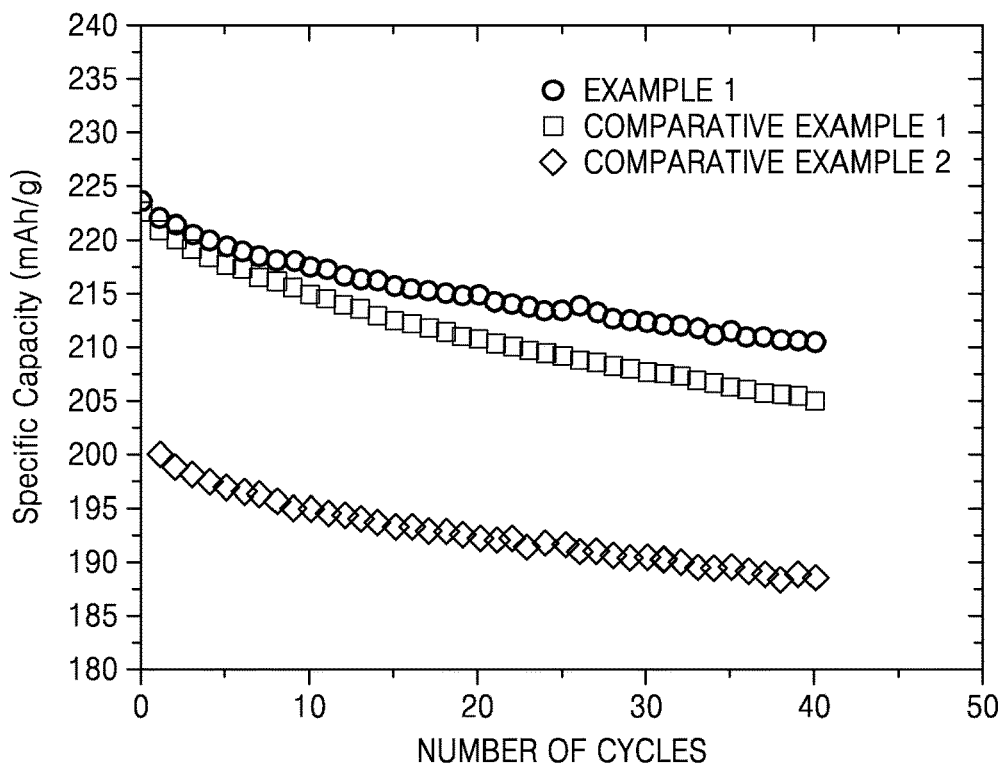
FIG. 14 is a graph of specific discharge capacity (mAh/g) versus number of cycles of the materials prepared in Example 1, Comparative Example 1, and Comparative Example 2.
Figure 15:
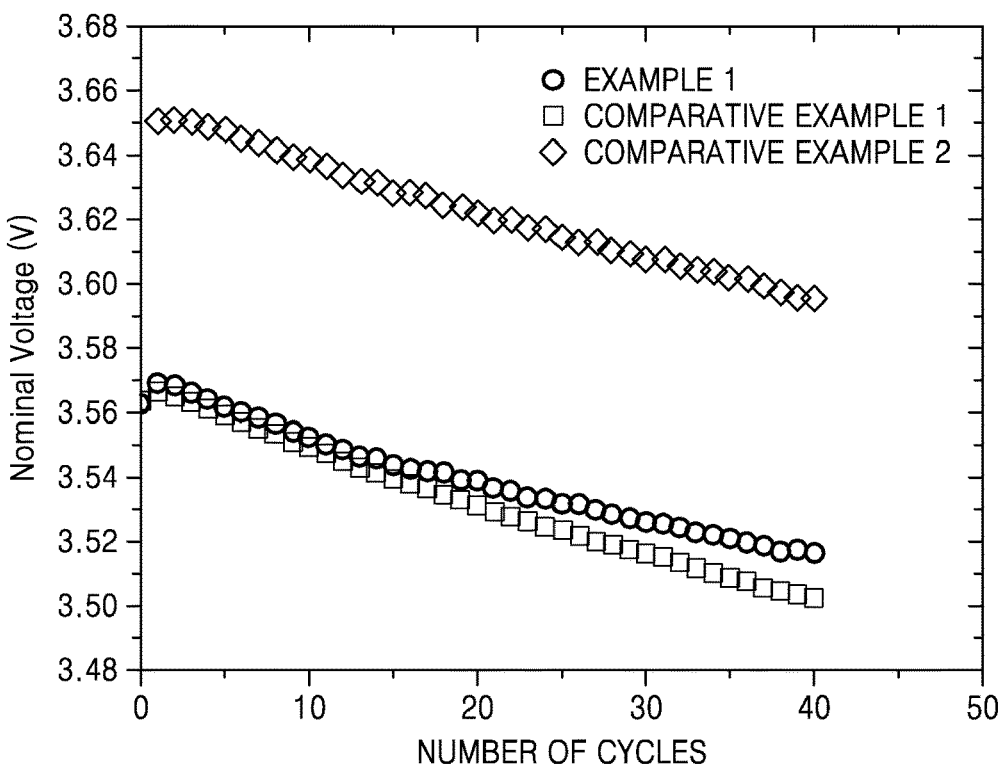
FIG. 15 is a graph illustrating nominal voltage (V) versus number of cycles of the materials prepared in Example 1, Comparative Example 1, and Comparative Example 2.

In addition, to confirm the doping effects of the metal cation in a core-shell structure, the discharge capacity per number of cycles and voltage characteristics of the coin half-cell of Example 1 were compared with those of the coin half-cells of Comparative Examples 1 and 2, and the results of comparing discharge capacity per number of cycles are shown in FIG. 14 and the results of comparing the voltage characteristics are shown in FIG. 15. In addition, Delta V (mV) values of the coin half-cells of Comparative Examples 1 and 2 and Example 1 are shown in Table 1.

TABLE 1

|  | Doping condition of OLO active material | Delta V (mV) |
|---|---|---|
| Comparative Example 1 | OLO active material not doped with metal cation | −64 |
| Comparative Example 2 | OLO active material entirely doped with V | −60 |
| Example 1 | OLO active material doped with V in a core-shell structure | −52 |

As shown in FIGS. 12 and 13 and Table 1, it was confirmed that the coin half-cell doped with the metal cation having a core-shell structure as manufactured in Example 1 had improved lifespan and voltage characteristics as compared to those of the half coin-cell that was not doped with any metal cation as manufactured in Comparative Example 1, and the half coin-cell in which the metal cation was entirely doped with the OLO active material particle as manufactured in Comparative Example 2.

The delta V (mV) values, which are not the absolute voltage values, were considered to be characteristic with regard to the voltage characteristics. As shown in Table 1, the case where the OLO active material was doped with the metal cation in the form of the core-shell structure (Example 1) exhibited voltage characteristics that were improved by about 8 millivolts (mV) as compared to where the OLO active material was entirely doped with the metal cation such as in Comparative Example 2.

As described above, according to the one or more of the above exemplary embodiments, a positive active material having a core-shell structure in which a high-capacity over-lithiated lithium transition metal oxide including a metal cation is prepared. A decrease in a battery capacity and voltage according to a charge and discharge cycle is suppressed in a battery including the positive active material having a core-shell structure, thereby improving lifespan characteristics of a lithium battery during high voltage operation.

It should be understood that exemplary embodiments described herein should be considered in a descriptive sense only and not for purposes of limitation. Descriptions of features or aspects within each exemplary embodiment should be considered as available for other similar features or aspects in other exemplary embodiments.

While one or more exemplary embodiments have been described with reference to the figures, it will be understood by those of ordinary skill in the art that various changes in form and details may be made herein without departing from the spirit and scope as defined by the following claims.

What is claimed is:

1. A positive active material comprising a lithium transition metal oxide having a core-shell structure,
wherein the lithium transition metal oxide is represented by Formula 2:

$x\text{Li}_2\text{MnO}_3\text{-}(1\text{-}x)\text{LiNi}_a\text{Co}_b\text{Mn}_c\text{O}_2$ <span style="float:right">Formula 2</span> wherein in Formula 2,
$0<x<1$, $0<a<1$, $0<b<1$, $0<c<1$, and $a+b+c=1$,
wherein a shell layer of the core-shell structure comprises a metal cation doped therein,
wherein the metal cation is V, and
wherein an amount of the metal cation is in a range of about 0.1 mole percent to about 10 mole percent, based on 1 mole of the lithium transition metal oxide.

2. The positive active material of claim 1, wherein a core of the core-shell structure does not comprise the metal cation.

3. The positive active material of claim 1, wherein a thickness of the shell layer of the core-shell structure is in a range of about 0.1 nanometers to about 500 nanometers.

4. The positive active material of claim 1, wherein the metal cation has a concentration gradient that gradually decreases in a direction from an outer surface of the shell layer to an inner surface of the shell layer.

5. The positive active material of claim 1, wherein the lithium transition metal oxide is a particle having an average particle diameter of about 10 nanometers to about 500 micrometers.

6. A positive electrode comprising the positive active material of claim 1.

7. A lithium battery comprising the positive electrode of claim 6.

8. The positive active material of claim 1, wherein the amount of the metal cation is in a range of about 0.2 mole percent to about 1 mole percent, based on 1 mole of the lithium transition metal oxide.

9. A method of manufacturing a positive active material, the method comprising:
- contacting a transition metal precursor comprising Ni, Co, and Mn and a vanadium cation precursor to form a coating comprising the vanadium cation precursor on the transition metal precursor;
- combining the vanadium cation coated transition metal precursor with a Li source to form a mixture; and
- heat treating the mixture to obtain the positive active material of claim 1.

10. The method of claim 9, wherein the contacting of the transition metal precursor and the metal cation precursor comprises dispersing the transition metal precursor and the metal cation precursor in a solvent.

11. The method of claim 9, further comprising adding a fluorine compound during the heat treatment.

12. The method of claim 11, wherein the fluorine compound is at least one selected from lithium fluoride, magnesium fluoride, strontium fluoride, beryllium fluoride, calcium fluoride, ammonium fluoride, ammonium difluoride, and ammonium hexafluoroaluminate.

13. The method of claim 9, wherein the heat treating is performed at a temperature of about 700° C. to about 900° C.

* * * * *